Jan. 6, 1959     F. M. KRANTZ ET AL     2,867,128
AUTOMATIC RANGE SYSTEM TRANSMISSION MEANS
Filed Aug. 8, 1956     3 Sheets-Sheet 1
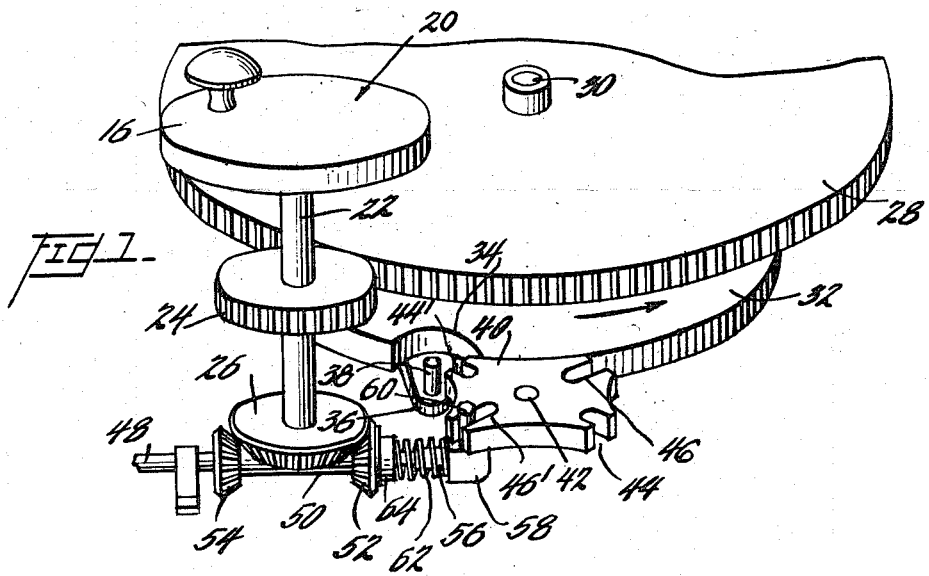
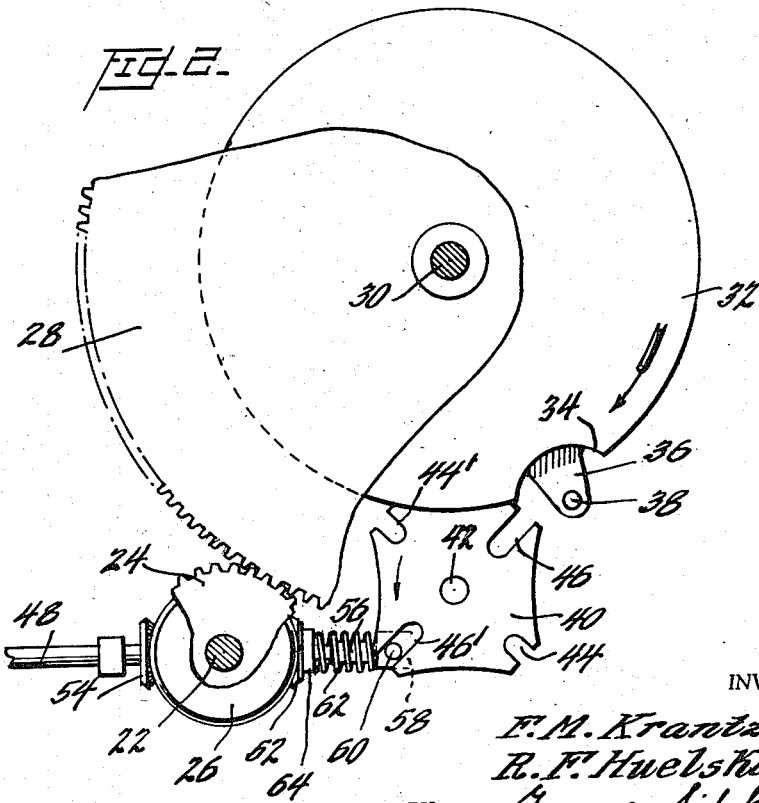
INVENTORS
F. M. Krantz
R. F. Huelskamp,
George Sipkin
B. L. Zangwill
BY     ATTORNEYS

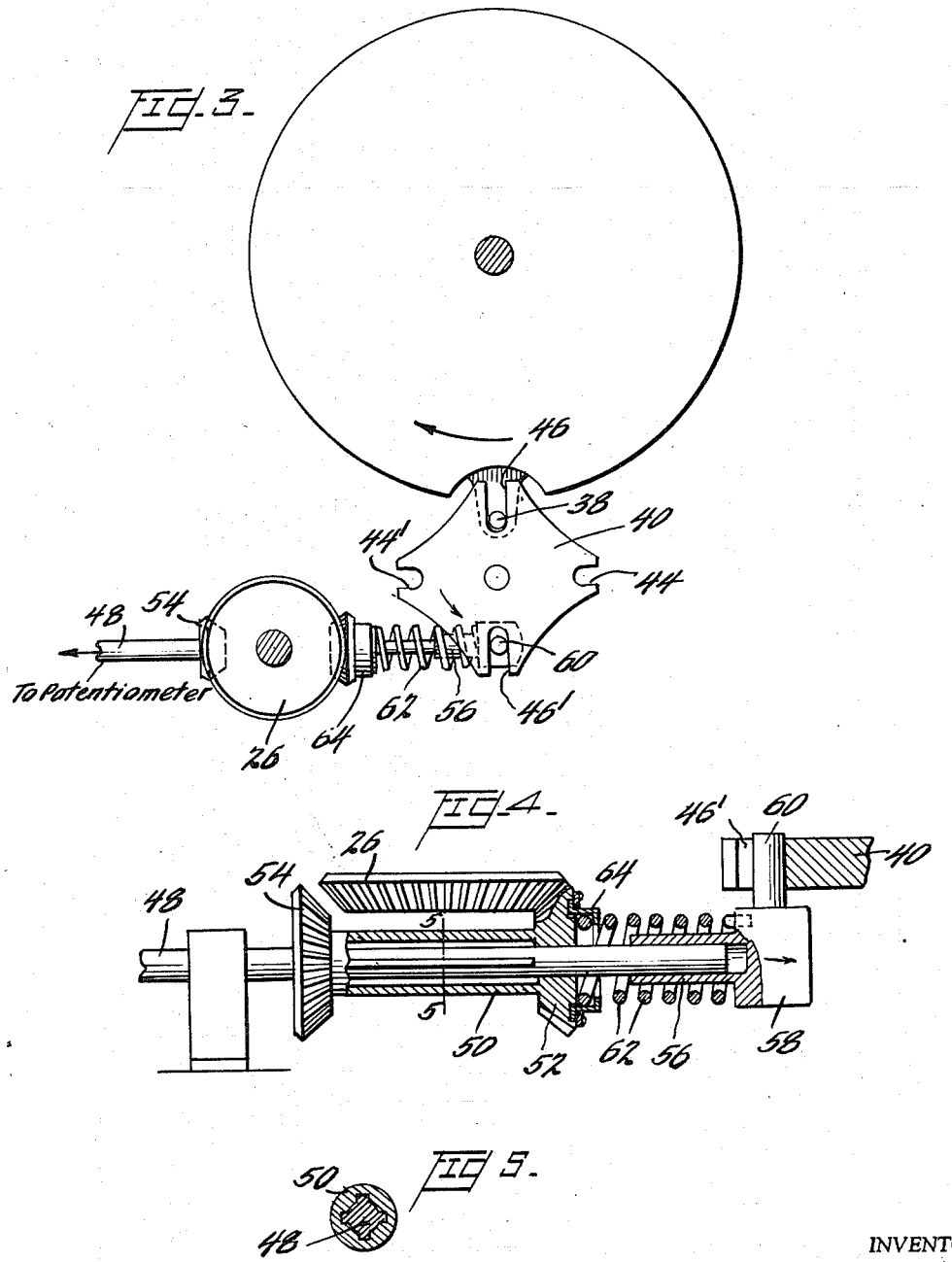

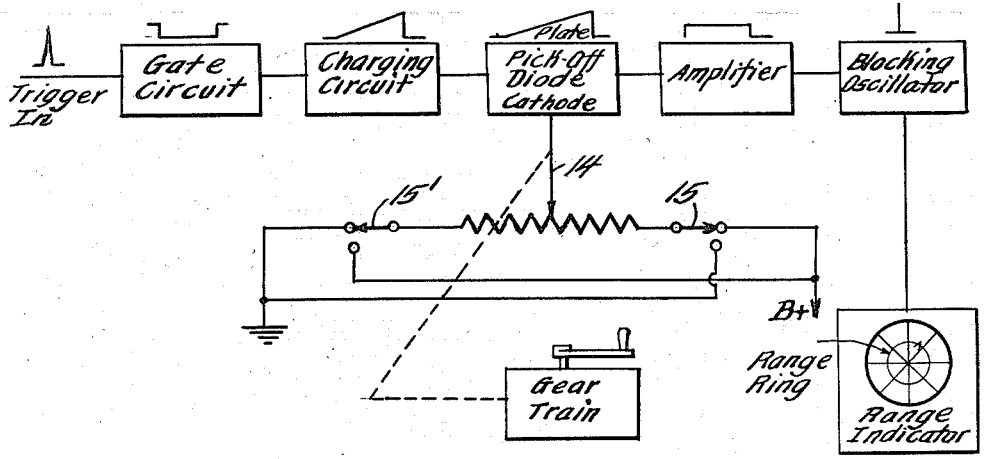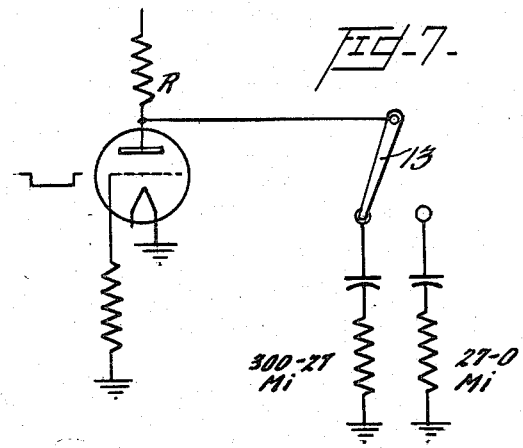

2,867,128

AUTOMATIC RANGE SYSTEM TRANSMISSION MEANS

Frank M. Krantz, Ellicott City, and Richard F. Huelskamp, Lansdowne, Md., assignors, by mesne assignments, to the United States of America as represented by the Secretary of the Navy Application August 8, 1956, Serial No. 602,946

6 Claims. (Cl. 74—378)

This invention relates to radar equipment, and more particularly to a manual control for use in operating a range indicator system used in radar equipment.

Generally speaking radar equipment includes a visual indicator, namely a cathode ray oscilloscope, on the face of which is presented the information necessary to locate a target. One type of indicator, cited by way of example only, is known as the P. P. I. type (plan position indicator). In the P. P. I. type of indicator a spot of light starts from the center of the tube face as each pulse is transmitted, and moves toward the edge along a radial line. Upon reaching the edge of the indicator tube, the spot quickly jumps back to the center and begins another trace as soon as the next pulse is transmitted. As the radar antenna rotates, the path of the spot rotates around the center of the indicator screen, and the equipment is so calibrated that the angle of the radial line on which the spot appears indicates the azimuth of the antenna beam, and the distance out from the center of the indicator indicates the range. When an echo is received, the intensity of the spot is increased considerably, and a bright spot remains at that point on the screen, even after the scanning spot has passed it. Of course in tracking an approaching target, the bright spot will move toward the center of the indicator scope, thereby indicating to the operator that the range is decreasing.

As a tracking aid, the equipment is provided with circuitry which produces a ring on the face of the indicator, said ring being known as a range-ring. By means of suitable circuitry, which includes a potentiometer, the movable member of which is connected through mechanical transmission means to a manually operated crank or the like, an operator is able to vary the radius of the range-ring by turning said crank. Thus the operator can superimpose the range-ring on the target, echo-spot and track the target by following said echo spot with the range-ring. The range-ring radius changing means, referred to above, is connected to a counter or the like which changes its reading with a change in range-ring radius; the system is calibrated so that the range-ring radius represents either miles or yards, and the counter gives a reading in the same unit of measure.

In order to obtain more sensitive tracking control for close-in ranges, radar indicators of the type described include more than one range, that is, a high range (e. g. 300–27 miles), and a low range (e. g. 27–0 miles). For each range, either the full radius of the indicator scope may be utilized, or the radius representing the low range may occupy a proportionately larger portion of the total scope radius than the high range (e. g. total radius=8"; high range 300–27 miles=5"; low range 27–0 miles=3").

In both systems it has heretofore been necessary for the operator to stop the tracking operation, and shift gears in the crank operated transmission means that is connected to the potentiometer; this is frequently done by pulling outwardly on the crank. In shifting from one scale to another, the direction of movement of the potentiometer is reversed, which makes possible the use of full potentiometer capacity for each tracking range. Suitable, automatic switching means is provided for reversing the end connections of the potentiometer, when rotation thereof is reversed, so that the resistance thereof will continue to vary in the same direction relative to the overall circuit, instead of reversing when the potentiometer is reversed. In addition, suitable automatic switching means is provided for changing the charging circuit of the indicator oscilloscope, so that the full potentiometer capacity may be utilized for each range scale.

By virtue of the necessity for manually shifting gears when crossing from high range to low range operation, the prior art ranging equipment has a number of disadvantages. There is considerable unhandiness in the manual shift transmission means, in that, the gear change is not accomplished smoothly. Further, there is particular difficulty if plotting is to be done in the region of the gear shift point, since it is necessary for the control knob or crank to be halted when the gearing is shifted in crossing the beginning of the low range. It is an object of this invention to overcome these disadvantages.

Another object of this invention is to provide a transmission means, wherein the direction of rotation of a driven shaft may be reversed, without reversing the direction of rotation of the driving shaft.

A further object of this invention is to provide a transmission means, wherein a driven shaft may be reversed, without reversing the direction of rotation of the driving shaft, without manually shifting gears.

Still another object of the invention is to provide a manually operated means for varying the radius of a range ring on a radar indicator.

Still a further object is to provide manual control means for changing from high range to low range operation of a radar range indicator, said manual means not necessitating the shifting of gears by the operator of said indicator.

An additional object is to provide a manual control means for varying the radius of a range ring on a radar indicator, and for shifting from high range operation to low range operation, without the operator shifting gears, the shift from one range to another being carried out automatically; the same ratio of rotation being maintained between a hand-operated crank member and a shaft driven thereby, in both the high range and the low range of operation.

Still an additional object is to provide a means whereby the entire capacity of a single potentiometer may be used in varying the radius of a range ring on a radar indicator in both the high range of operation and the low range.

Yet another object is to provide means whereby a single rotary potentiometer is utilized in all ranges of operation of a radar indicator, the direction of rotation of the potentiometer being reversed upon shifting from one range to a second range.

In accordance with this invention, there is provided a manually controlled transmission means for varying the radius of a range ring on a radar indicator scope, said transmission means, contrary to apparatus heretofore used and described above, not requiring the operator to shift gears in changing from one tracking range to another. The transmission means is connected between either a control knob or crank and a potentiometer used for varying the resistance in the range ring circuit. By varying the resistance in the range ring circuit, the radius of the range ring is varied on the scope. As pointed out above, in the operation of a radar indicator of the class described, it becomes necessary to shift from a long distance or high range scale, to a short distance or low range scale; this is done in order to obtain greater tracking sensitivity, as the target approaches nearer the radar equipment.

Pursuant to this invention a transmission means is provided between either a control knob or crank and a variable tap on a potentiometer, whereby the direction of movement of the variable tap is reversed upon changing from one tracking scale to the other, thereby allowing a full range of potentiometer tap movement in both the high range scale and the low range scale. The means described hereinafter makes possible this reversal of end movement without necessitating a shifting of gears by the radar operator, whereby it is possible for him to continue rotating the control knob in the same direction for both the high range readings and low range readings.

Other objects and many of the attendant advantages of this invention will be readily appreciated as the same becomes better understood by reference to the following detailed description when considered in connection with the accompanying drawings wherein:

Fig. 1 is a perspective view of a preferred embodiment of the invention showing the same at the beginning of a cycle of operation;

Fig. 2 is a plan view of the structure shown in Fig. 1, showing a portion thereof broken away, and showing the device at a slightly advanced stage of operation;

Fig. 3 is a sectional view similar to Fig. 2 showing the device at a still further advanced stage in its operation;

Fig. 4 is an elevational view partly in section of a portion of the structure shown in Fig. 3;

Fig. 5 is a vertical sectional view taken on line 5—5 of Fig. 4;

Fig. 6 is a block diagram of a typical radar indicator circuit of the type to which the applicants' invention is adapted to be applied; and Fig. 7 is a circuit diagram of a typical charging circuit of the type referred to in Fig. 6.

In radar equipment, it is customary to provide a range indicator circuit having an indicator scope connected thereto. A typical example of such an indicator circuit is shown in Fig. 6 wherein the various components are shown in block form, said components being conventional in this art. It is pointed out that the incoming signal is varied in the manner shown in Fig. 6 until, at the last stage, it is fed to a cathode ray oscilloscope and appears on the face thereof as a spot of light which rotates about the center point of said face in a manner described above. As is well known, radar equipment of the type referred to, an example of which is Navy Model VK4, is adapted to receive an echo from the target being tracked, and present said echo as an intensified spot of light on the indicator scope.

The first spot of light referred to above, or tracking spot, rotates about the center of the oscilloscope and due to the fact that a high persistence face is provided on said oscilloscope, said spot traces a circular ring on said face. By moving a variable tap 14 on a potentiometer 12 shown in Fig. 6, said ring of light, otherwise known as the range ring, is caused to either increase or decrease in radius, depending of course on the direction in which the tap is moved. The range ring is superimposed on the echo spot presented on the face of the scope, the radius of said range ring, as pointed out above, being utilized as a measure of the range, or distance of the target from the transmitted signal. The operator of the indicator mechanism turns a crank 16 connected to suitable transmission means 18, thereby moving the variable tap 14 on the potentiometer 12, which in turn causes the range ring to vary in radius, thus enabling the operator to track the target.

It is conventional to provide apparatus of the type described above, with means whereby the range scale may be varied, that is, means are provided for changing from one scale, as for example, a scale of 300 miles to 27 miles to a second scale of 27 miles to 0 miles. The full radius of the tube is utilized in tracking each range, therefore it is necessary to provide the range indicator circuit (Figs. 6 and 7) with means for changing the charging circuits; suitable switching means 13 being provided for changing from one charging circuit to another upon changing from one scale to another. As pointed out, in each range of sensitivity the full capacity of the potentiometer is utilized, the movable tap on the potentiometer being reversed in switching from one range to the other. Upon reversing the tap on the potentiometer it is necessary to provide suitable switching means 15 and 15' for switching the end connections of the potentiometer, thereby reversing the same, so that the resistance will continue to vary in the same manner as before, that is, will continue to decrease or increase as the case may be, so that the range ring for the next scale will continue to move inwardly toward the center of the scope. The switching of the charging circuits and the end connections of the potentiometer is carried out by suitable switching members connected to the gear train and crank mechanism shown in Fig. 1 such switching mechanism being conventional in the radar art.

In accordance with this invention a transmission means is provided whereby the movement of the variable tap 14 on the potentiometer 12 can be reversed in switching from one scale of sensitivity to another without necessitating the manual shifting of gears by the operator. The structure shown in Fig. 1 is an embodiment of the applicants' invention designed to bring about this reversal.

The mechanism shown in Fig. 1 comprises a hand-operated crank member 20 having a crank shaft 22 fixedly attached thereto, said shaft having fixedly mounted thereon, intermediate its ends, a pinion gear 24. A bevel gear 26 is fixedly mounted at the lower end of shaft 22. In driving relation with the pinion is a larger gear 28 fixedly mounted on a second shaft 30 which is parallel with the crank shaft 22. The shaft 30 has a disc 32 fixedly mounted at its lower end for rotation therewith. The disc 32 has a recess 34 in its peripheral edge, for a purpose hereinafter set forth. An extension member 36 is provided at the edge of disc 32 adjacent the recess 34, and has a stud 38 attached thereto and extending parallel to the shafts 22 and 30.

A modified Geneva cam 40 is rotatably mounted on a pin 42 adjacent the periphery of the disc member 32. The cam 40 is provided with a notch at each of its corners, two notches 44 and 44' that are located opposite each other being of shallower depth than the other two notches 46 and 46', as can be seen in Figs. 4 and 5. The side edges of the cam 40 are so shaped and proportioned that they are in sliding contact with the peripheral edge of the disc 32.

Mounted at right angles to the crank shaft 22 is a rotatable shaft 48 adapted to be connected to the variable tap 14 of the potentiometer 12 for the purpose of moving the same. A sleeve 50 is slidably mounted on the potentiometer drive shaft 48 and is rotatable therewith by virtue of a spline connection thereto. The sleeve 50 has bevel gears 52 and 54 fixedly mounted thereon at the respective ends thereof, in the manner shown in Figs. 2 and 4; each of said bevel gears 52 and 54 being adapted to be brought into mesh with the bevel drive gear 26 in a manner hereinafter set forth.

The potentiometer drive shaft 48 has slidably mounted at one end thereof a tubular member 56, said shaft 48 being rotatable within said tubular member 56. A block member 58 is fixedly mounted on one end of the tubular member 56. The block member 58 is provided with a fixedly attached pin 60 extending at substantially right angles to the tubular member 56, said pin being slidably engaged within the slot 46' in the Geneva cam 40 in the manner shown in Fig. 3. A coil spring 62 is mounted about the potentiometer shaft 48 between the right-hand bevel gear 52 and the left-hand face of the block member 58. The left end of spring 62 is attached to a slip bearing 64 that is rotatably mounted on the right-hand bevel gear 52 in the manner shown in Fig. 6. The opposite end of the spring is affixed to the left-hand face of the block member 58 or to the outer wall of the tubular extension 56.

At the beginning of a ranging operation, the elements of the applicants' device are situated in the manner shown in Fig. 1. At this stage of operation further movement of the stud 38 in a counter-clockwise direction is prevented because the adjacent slot 44' in the Geneva cam 40 is so shallow that the stud 38 cannot move far enough to cause rotation of said cam 40. In consequence, upon beginning movement of the range crank 20, as for example at a range of 300 miles, the operator must rotate the range crank in a counter-clockwise direction, thereby causing clockwise motion of the stud 38. At this stage of operation the coil spring 62 is under compression and therefore forces the right-hand bevel gear 52 into mesh with the bevel drive gear 26 carried on the crank shaft 22; thus, counter-clockwise rotation of said range crank 20 will cause the potentiometer drive shaft 48 to rotate in a clockwise direction. As the stud approaches the end of its first rotation in a clockwise direction (Fig. 2), it enters a deep slot 46 on the cam 40 and causes the cam to rotate in a counter-clockwise direction in the manner shown in Fig. 3, a corner of said cam moving through the recess 34 in disc 32.

In rotating counter-clockwise, the cam 40, which is in engagement with pin 60, causes said pin, the block 58, and the right-hand end of spring 62 which is attached to said block, to move toward the right in the manner shown in Fig. 3. The right-hand movement of elements 60, 58 and 62 causes the right-hand bevel gear 52 and the sleeve 50 affixed thereto to be moved to the right. The elements are so proportioned that the right-hand movement of the spring 62 causes the right-hand bevel gear 52 to become disengaged from, and the left-hand bevel gear 54 to become engaged with, the crank shaft driven bevel gear 26. The operator continues rotation of the crank in a counter-clockwise direction and the stud 38 rotates the Geneva cam until it is able to leave the slot 46, said stud continuing to rotate in a clockwise direction for one more revolution. Since the left-hand bevel gear 54 is now in engagement with the crank driven bevel gear 26, the continued rotation of the range crank 20 in a counter-clockwise direction will cause the potentiometer driving shaft 48 to rotate in a direction reverse to that of when gear 52 was engaged with gear 26, that is, in a counter-clockwise direction; such rotation continues until the stud 38 completes another revolution in a clockwise direction and enters the other shallow slot, 44, in the cam, at which time further rotation thereof is prevented. At this point the operator has completed the tracking operation, having tracked from maximum distance to zero distance. He has also been able to go from high scale, or long range tracking, to low scale tracking without having to shift gears or otherwise pause in the tracking operation.

It is pointed out that by virtue of the applicants' structure, as described above, it is possible for the operator to immediately start another tracking operation after stud 38 comes to a stop in shallow slot 44, merely by reversing the direction of rotation of crank 20, reversing the end connections of the potentiometer 12 and changing the charging circuits back to a high scale or long range setting.

There are two particular advantages to the spring coupling arrangement pointed out above. First, the snug contact between the pair of gears reduces the backlash considerably, which makes for good control; and secondly, if contact is made at some point between direct tooth mesh the spring acts as a spring clutch until the teeth are seated.

The various gears are proportioned so that the variable tap on the potentiometer will either rotate or otherwise move through its full range in one direction, prior to the shifting of the bevel gears 52 and 54, and will be rotated through its full range in the opposite direction after the shifting of said gears. Thus, the operator need rotate the range crank 20 in a counter-clockwise direction only, for both the directions of movement of the variable tap on the potentiometer. This arrangement of course eliminates the necessity for the operator to manually shift gears or reverse the rotation of the crank handle in changing the direction of movement of the variable tap 14.

For the reasons pointed out above, the ranging circuitry is so adjusted that the full range of the potentiometer 12 may be utilized for each range of sensitivity of the indicator. This includes either manually or automatically actuated switching means, such as 15 and 15' shown in Fig. 6, for reversing the end connections of the potentiometer, and either manually or automatically actuated switching means 13 (Fig. 7) for changing the charging circuits; an example of a typical charging circuit appears in Fig. 7. It is pointed out that the switching operations referred to are usually carried out automatically in changing from one tracking range to another, e. g., 300-27 miles to 27-0 miles.

It is again pointed out that the applicants' structure eliminates the need for shifting gears in changing from one ranging scale to another, and allows smooth, continuous tracking of the target while changing range scales. This allows for greater accuracy in tracking and lightens and simplifies the operator's duties.

It should be understood, of course that the foregoing disclosure relates to only a preferred embodiment of the invention and many modifications and variations of the present invention are possible in the light of the above teachings. It is therefore to be understood that within the scope of the appended claims the invention may be practiced otherwise than as specifically described.

What is claimed is:

1. An automatic transmission device comprising a driving shaft, a driven shaft, a driving bevel gear fixedly mounted on said driving shaft for rotation therewith, a pair of driven bevel gears mounted on said driven shaft for rotation therewith; means actuated by said driving shaft for moving one of said driven bevel gears into engagement with said driving bevel gear and moving said other driven bevel gear out of engagement with said driving bevel gear, whereby for a given direction of rotation of the driving shaft, a driving connection between the driving bevel gear and one of the driven gears causes said driven shaft to be rotated in one direction, and driving connection with the other driven gear causes rotation of said driven shaft in an opposite direction.

2. An automatic transmission device as set forth in claim 1 wherein, a sleeve member is slidably mounted on said driven shaft for rotation therewith, said driven bevel gears being fixedly mounted at the opposite ends of said sleeve member for rotation therewith, said sleeve member being movable along said driven shaft so as to bring one driven gear into mesh with the driving gear and the other driven gear out of mesh with said driving gear.

3. An automatic transmission device for imparting alternating rotary motion, comprising a drive shaft and a driven shaft, a bevel gear attached to said drive shaft for rotation therewith, pinion gears spacedly mounted on said driven shaft and longitudinally slidable there along and rotatable therewith, pinion shifting means actuated by said driving shaft and adapted to selectively bring said pinion gears into mesh with said bevel gear, whereby for a given direction of rotation of the drive shaft, a driving connection between said bevel gear and one of said pinions causes said driven shaft to be rotated on one direction, and a driving connection with the other of said pinions causes rotation of said driven shaft in an opposite direction, stop means associated with said pinion shifting means to stop rotation of said drive shaft after a predetermined number of rotations thereof in one direction, whereby rotation of said driven shaft is likewise stopped after a predetermined number of rotations.

4. An automatic transmisison device comprising a drive shaft having a bevel gear mounted thereon, a driven shaft having a pair of bevel pinion gears slidably mounted thereon and rotatable therewith, said pinion gears being adapted to selectively mesh with said bevel gear, whereby rotation of said driven shaft may be reversed while said drive shaft rotates in the same direction, a rotary star wheel mounted for rotation relative to said drive shaft and said driven shaft, gear shifting means connecting said star wheel to said pinion gears, means for intermittently rotating said star wheel, said latter means being driven by said drive shaft, whereby rotation of said drive shaft causes intermittent shifting of said bevel pinion gears into selective mesh with the bevel gear on said drive shaft, thereby causing reversal of said driven shaft.

5. An automatic transmission device for imparting alternating rotary motion, comprising a rotary drive shaft having a bevel gear mounted thereon for rotation therewith, a second rotary shaft spacedly mounted from said drive shaft, means drivingly connecting said drive shaft and said second shaft whereby rotation of said drive shaft causes rotation of said second shaft, a disk member fixedly mounted on said second shaft for rotation therewith, a cam pin mounted at the periphery of said disk and extending outwardly from the edge thereof, a recessed area provided in the periphery of said disk and extending radially of said cam pin toward the axis of said disk, a star wheel pivotally mounted on an axis parallel to said second shaft, said star wheel being provided with a first group of radially extending slots of a size adapted to receive said cam pin, the periphery of said star wheel consisting of a plurality of edges adapted to slidably coact with the periphery of said disk, a pair of said slots being so dimensioned as to allow entry of said cam pin thereinto, whereby movement of said cam pin relative to said star wheel causes rotation of said star wheel about its axis, the recess in the periphery of the disk and the portion of the star wheel adjacent each of the slots being so dimensioned that said portion may enter said recess thereby allowing rotation of said star wheel relative to said disk upon entry of said cam pin into one of said slots, a second group of slots in said cam wheel and alternating with said first slots, said second group of slots being of a depth such that movement of said cam pin relative to said star wheel is arrested upon entry of said cam pin into one of said second slots; a driven shaft, a pair of bevel pinion gears mounted on said driven shaft and rotatable therewith and slidable longitudinally thereof, said pinion gears being adapted to selectively mesh with the bevel gear on said drive shaft, pinion gear shifting means associated with said pinion gears and said star wheel and adapted to be moved by said star wheel upon movement of the latter by said cam pin, whereby movement of said star wheel causes engagement of one pinion gear with said bevel gear and disengagement of the other pinion gear from said bevel gear, whereby rotation of said driving shaft causes intermittent shifting of said pinion gears relative to said bevel gear thereby causing said driven shaft to rotate first in one direction and then in an opposite direction while said drive shaft rotates in one direction only, said second slots in said star wheel respectively acting as a stop means adapted to prevent rotation of said drive shaft after a predetermined number of rotations.

6. A transmission device for imparting alternating rotary motion comprising, a drive shaft and a driven shaft, a bevel gear attached to said drive shaft for rotation therewith, pinion gears spacedly mounted on said driven shaft and longitudinally slidable therealong, and rotatable therewith, pinion shifting means actuated by said drive shaft and adapted to selectively bring said pinion gears into mesh with said bevel gear, whereby for a given direction of rotation of the drive shaft, a driving connection between said bevel gear and one of said pinions causes said driven shaft to be rotated in one direction, and a driving connection with the other of said pinion causes rotation of said driven shaft in an opposite direction; and resilient means for forcing said respective pinions into contact with said bevel gear.

References Cited in the file of this patent
UNITED STATES PATENTS

| | | |
|---|---|---|
| 1,199,308 | Sanders | Sept. 26, 1916 |
| 1,216,865 | Smith | Feb. 20, 1917 |
| 2,742,637 | Braddon et al. | Apr. 17, 1956 |